Patented Sept. 26, 1944

2,359,260

UNITED STATES PATENT OFFICE 2,359,260

SYNTHESIS OF VITAMIN B6

Lester Joseph Szabo, Cleveland, Ohio, assignor, by mesne assignments, to S. M. A. Corporation, Chicago, Ill., a corporation of New Jersey No Drawing. Application September 21, 1939, Serial No. 295,987

1 Claim. (Cl. 260—295.5)

Vitamin B6, or Adermin is a factor for the prevention of dermatosis. The natural occurrence of this vitamin, as in yeast, renders necessary the administration of a large amount of the vitamin carrying material before the antidermatosis factor can be established in a deficiency corrective diet. The bulk of the proper intake precludes rapid establishment of the factor in the system and difficult toleration of short interval dosage.

It has been found by other investigators such as Kuhn and his co-workers that Adermin is a definite chemical entity, being 2-methyl-3-hydroxy-4,5-di-(hydroxy - methyl) - pyridine which can, by proper methods, be prepared by synthesis.

It will be obvious that the vitamin, prepared by synthesis and presented in form suitable for definitely controlled administration, will present many advantages for use in vitamin therapy over the use of the usual carrier material with resultant reduction in the amount of bulk intake and a substantial lessening of the cost of treatment.

As a starting point for my improved method of synthesis I prefer to use an isoquinoline, usually 3-methyl-4-methoxylsoquinoline, but any of its derivatives substituted in the benzene ring or substituted in position 1 by a halogen or the nitro group will serve equally as well for starting material.

Various steps are included in the process of synthesis, of which the following is an illustrative example.

I. Preparation of 2-methyl-3-methoxy-pyridine-4-5-dicarboxylic acid 160 grams of 3-methyl-4-methoxy-isoquinoline is oxidized by slow addition to a solution of potassium permanganate previously prepared from 720 grams of potassium permanganate which has been dissolved in about 8 liters of water. This addition is carried on at a rate so that the temperature will not exceed 65° C. Reaction is allowed to proceed until the characteristic color of the potassium permanganate is completely discharged after which the liquid is filtered to remove the oxides of manganese formed during the reaction. The clear filtrate is then acidified with sulfuric acid to a point where it is acid to Congo red as an indicator of pH and then treated with about 250 grams of solid hydrated copper sulfate (copper sulfate pentahydrate) and is boiled and cooled. The copper salts will crystallize out of the liquid and are filtered off. These salts are then decomposed by suspension in from four to five times their weight of water with the addition of sodium hydroxide until the pH is distinctly alkaline. Approximately 40 grams of sodium hydroxide to each 100 grams of copper salts have been found suitable. This is then boiled slowly and filtered to remove the copper oxide, now in the form of a precipitate. The filtrate is brought to a pH of 1.6 by sulfuric acid in an amount substantially equal to the amount of alkali used. Hydrogen sulfide can be used to decompose the copper salts.

The solution is now cooled and the solid acids either filtered off or recovered by evaporation to dryness. The dry acids are then separated by crystallization from alcohol or the phthalic acid formed during oxidation may be extracted by ether in which it is soluble. The 2-methyl-3-methoxypyridine-4-5-dicarboxylic acid is then recrystallized, preferably from water.

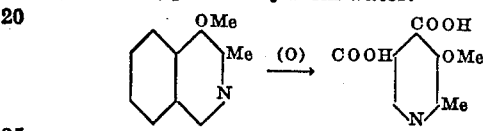

II. Formation of 2-methyl-3-methoxypyridine-4-5-dicarboxylic acid dichloride One part of the 2-methyl-3-methoxypyridine-4-5-dicarboxylic acid as obtained above is treated with two parts of phosphorus pentachloride in the cold. The mixture soon liquifies and the reaction is completed by warming in a water bath. The phosphorus chlorides formed during the reaction are then removed by distillation in vacuo. The acid chloride is not isolated but is used directly in the following step.

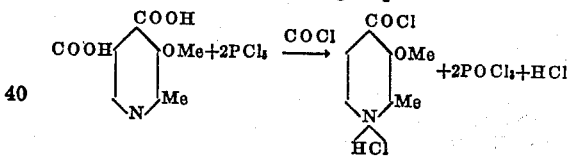

III. Formation of 2-methyl-3-methoxy-4-(or 5)-cyanopyridine-5-(or 4)-carboxylic acid The acid dichloride obtained in the above reaction is added slowly with accompanying vigorous agitation to a great excess of 15% aqueous ammonia. At least ten times the volume of aqueous ammonia to the volume of acid chloride is used. A solution containing monocarboxylic acid mono-nitrile ammonium salt soon forms. This solution is then cooled and treated by passing in sulfur dioxide gas until a white crystalline precipitate is formed. This precipitate is purified by careful addition to cold dilute aqueous alkali or ammonia and is then reprecipitated by sulfur dioxide. This precipitate is somewhat soluble in water and soluble in alkali but insoluble in ether.

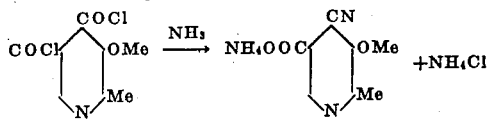

The above shows the main product of the reaction.

IV. Formation of 2-methyl-3-methoxy-4-cyanopyridine-5-carboxylic acid chloride One part of the 2-methyl-3-methoxy-4-cyanopyridine-5-carboxylic acid thus formed is treated with one part of phosphorus pentachloride and warmed on a steam bath until no more hydrogen chloride is evolved. The excess phosphorus chlorides are removed under reduced pressure while on the steam bath.

In this step, in place of the phosphorus pentachloride, one part of the acid may be refluxed by proper condensation with from two to three parts of thionyl chloride.

The solid material obtained from the use of either chloride is used without purification.

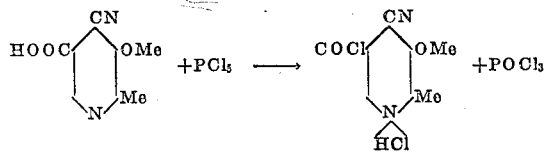

V. Preparation of 2-methyl-3-methoxy-4-cyanopyridine-5-carboxamide

The acid chloride obtained in Step IV is slowly added with vigorous stirring to a ten fold excess of 15% aqueous ammonia. The acid chloride slowly dissolves. Evaporation to dryness recovers the carboxamide accompanied by ammonium chloride.

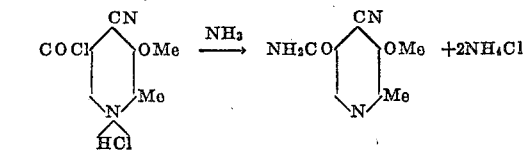

VI. Preparation of 2-methyl-3-methoxy-4-5-dicyanopyridine

The mixture of the carboxamide and ammonium chloride as obtained above is treated with a ten fold quantity of thionyl chloride. The resulting reaction mixture is kept at a temperature of 100° C. for from six to eight hours, allowed to cool and then poured onto ten times its weight of crushed ice. After complete melting of the ice the watery solution is filtered and carefully neutralized with any suitable alkali such as sodium or potassium hydroxides or the corresponding carbonates or bicarbonates and extracted several times with suitable quantities of chloroform. The combined chloroform extracts are then evaporated in any proper apparatus to remove the chloroform and the residue recrystalized from alcohol.

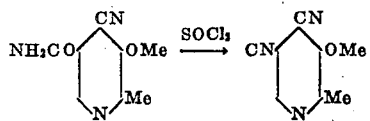

In the above step, in lieu of the thionyl chloride, phosphorus pentoxide may be used in an amount of five times the weight of the mixture of carboxamide and ammonium chloride.

VII. Formation of 2-methyl-3-methoxy-4-5-di-(aminomethyl)-pyridine 43 grams of the 2-methyl-3-methoxy-4-5-dicyanopyridine obtained as above is dissolved in 1800 cc. of glacial acetic acid with the addition of 40 grams of a 5% palladium-charcoal catalyst containing 2.5% platinum oxide. The mixture is shaken with hydrogen under low pressures of from three to five atmospheres until four moles of hydrogen are absorbed. The solution is then filtered and evaporated under reduced pressure to dryness. The resultant residue may or may not be recrystallized from alcohol.

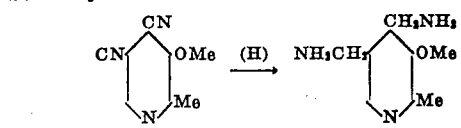

VIII. Preparation of 2-methyl-3-hydroxy-4-5-di-(aminomethyl)-pyridine 36.2 grams of the residue obtained in Step VII is refluxed in a suitable condenser with 400 cc. of 50% hydrobromic acid until distillation over of methyl bromide stops. The solution is cooled and if necessary concentrated and five volumes of acetone added. The solution is now cooled in ice and yellowish crystals separate which are filtered off. These solids are dissolved in water and exactly neutralized with potassium hydroxide after which the neutral solution is evaporated to dryness under reduced pressure and the residue taken up in alcohol. The inorganic salts, such as potassium bromide or the bromide of the particular alkali used are filtered off. Potassium hydroxide is preferable because of the somewhat less solubility in alcohol of potassium bromide.

The filtrate is evaporated, again taken up in alcohol, again filtered and evaporated to dryness.

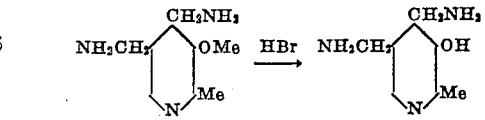

IX. Formation of vitamin B₆, 2-methyl-3-hydroxy-4-5-di-(hydroxymethyl)-pyridine 16.7 grams of the 2-methyl-3-hydroxy-4-5-di-(aminomethyl)-pyridine as obtained above is dissolved in 135 cc. of 10% sulfuric acid and the solution cooled to 0° to 5° C. A cold concentrated aqueous solution of 35.5 grams sodium nitrite is slowly added with vigorous agitation and the mixture slowly heated to nearly the boiling point and maintained at such temperature for ten minutes. While the solution is still warm a sufficient amount of urea is added to destroy the sodium nitrite and the solution is then cooled. It is then exactly neutralized with potassium hydroxide and evaporated to dryness under reduced pressure. The dry solid is repeatedly extracted with methanol and the combined methanol extracts evaporated to dryness. This residue is the vitamin B₆. If further purification is necessary, sublimation in high vacuum may be used or proper process of crystallization utilized.

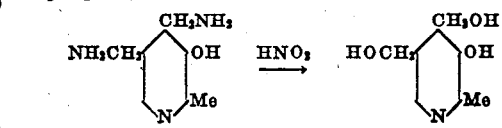

The synthesized product crystallizes into colorless odorless needles having a melting point of 158–9° C. It is soluble in methanol, ethanol ether and acetone.

If the hydrochloride is desired, the free base may be converted by evaporation with hydrochloric acid. The hydrochloride forms odorless, colorless rosettes of prismatic needles having a melting point of 205–6° C. It may be sublimed under high vacuum and is soluble in water and aqueous alcohol. It is insoluble in cold absolute alcohol, dioxan dry acetone and dry ether.

I claim:

2-methyl-3-methoxy-4-cyanopyridine-5-carboxamide.

LESTER JOSEPH SZABO.